US010382251B2

(12) United States Patent
Loegering et al.

(10) Patent No.: US 10,382,251 B2
(45) Date of Patent: Aug. 13, 2019

(54) TRANSACTION EXECUTION IN MULTI-TIER COMPUTING ENVIRONMENTS

(71) Applicant: SAP SE, Walldorf (DE)

(72) Inventors: Kristen Loegering, Moss Beach, CA (US); Arun Thiyagarajan, Cupertino, CA (US); Srinivasa Raju Indukuri, Cupertino, CA (US); Prabhu Madanagopal, Santa Clara, CA (US); Venkata Tummala, San Jose, CA (US)

(73) Assignee: SAP SE, Walldorf (DE)

( * ) Notice: Subject to any disclaimer, the term of this patent is extended or adjusted under 35 U.S.C. 154(b) by 515 days.

(21) Appl. No.: 15/224,329

(22) Filed: Jul. 29, 2016

(65) Prior Publication Data

US 2018/0034684 A1  Feb. 1, 2018

(51) Int. Cl.
*H04L 12/24* (2006.01)
*G06Q 30/06* (2012.01)
*H04L 29/08* (2006.01)

(52) U.S. Cl.
CPC ....... *H04L 41/044* (2013.01); *G06Q 30/0633* (2013.01); *H04L 41/0803* (2013.01); *H04L 41/5051* (2013.01); *H04L 67/1089* (2013.01)

(58) Field of Classification Search
CPC . H04L 41/5045; H04L 61/256; H04L 41/044; H04L 67/32; H04L 67/02; H04L 41/06; H04W 76/12; H04N 19/30
See application file for complete search history.

(56) References Cited

U.S. PATENT DOCUMENTS

| 6,094,416 | A  | * | 7/2000  | Ying ............... G06F 11/2033 370/222 |
| 8,274,377 | B2 | * | 9/2012  | Smith ............. G08B 21/10 340/286.02 |
| 8,326,883 | B2 | * | 12/2012 | Pizzorni ............ G06F 8/60 707/795 |
| 8,713,077 | B2 | * | 4/2014  | Kazar ............... G06F 3/0611 707/812 |
| 9,241,044 | B2 | * | 1/2016  | Shribman ........... H04L 67/06 |
| 9,697,267 | B2 | * | 7/2017  | Kadayam .......... G06F 11/1448 |
| 10,120,756 | B2 | * | 11/2018 | Resch ............... G06F 11/1076 |
| 2003/0084134 | A1 | * | 5/2003 | Pace ................. G06F 8/60 709/223 |

(Continued)

*Primary Examiner* — Sargon N Nano
(74) *Attorney, Agent, or Firm* — Jones Day

(57) ABSTRACT

Within a multi-tier computing environment having a plurality of computing nodes, a first node accesses a data object encapsulating values. Thereafter, the first node generates node specific messages for each of a plurality of tiered nodes in the multi-tier computing environment relating to a transaction. The node specific messages encapsulate at least a portion of the values in the accessed data object and are respectively based on access visibility information associated with each such node. Thereafter, the first node transmits the corresponding node specific messages to each of the plurality of tiered nodes. The first node, in response to the transmitted node specific messages, receives data comprising a plurality of responses in response to the receipt of the node-specific messages. The first node then orchestrates with the plurality of tiered nodes, completion of the transaction by transmitting messages to select nodes of the plurality of tiered nodes.

20 Claims, 5 Drawing Sheets

(56) References Cited

U.S. PATENT DOCUMENTS

| | | | | |
|---|---|---|---|---|
| 2009/0216910 A1* | 8/2009 | Duchesneau | ......... | G06F 9/5072 709/250 |
| 2013/0091252 A1* | 4/2013 | Pizzorni | ................ | G06Q 10/10 709/219 |
| 2014/0136590 A1* | 5/2014 | Marty | ................... | G06F 9/5066 709/201 |
| 2014/0337472 A1* | 11/2014 | Newton | ................ | H04L 67/32 709/217 |
| 2015/0012757 A1* | 1/2015 | Binder | ................... | H04L 63/18 713/190 |
| 2015/0049760 A1* | 2/2015 | Xu | ......................... | H04L 45/16 370/390 |
| 2015/0078385 A1* | 3/2015 | Shelly | .................... | H04L 45/38 370/392 |
| 2016/0105530 A1* | 4/2016 | Shribman | .............. | H04L 67/06 709/218 |

\* cited by examiner

TRANSACTION EXECUTION IN MULTI-TIER COMPUTING ENVIRONMENTS

TECHNICAL FIELD

The subject matter described herein relates to the execution of transactions with a multi-tier computing environment.

BACKGROUND

Computing environments are becoming increasingly complex with diverse and sometimes hierarchical computing nodes interacting with each other to effect transactions. These complexities can limit the types of transactions that can be completed and/or the efficiencies of such transactions.

SUMMARY

In one aspect within a multi-tier computing environment having a plurality of computing nodes, a first node accesses a data object encapsulating values. Thereafter, the first node generates node specific messages for each of a plurality of tiered nodes in the multi-tier computing environment relating to a transaction. The node specific messages encapsulate at least a portion of the values in the accessed data object and are respectively based on access visibility information associated with each such node. The multi-tier computing environment can be arranged such that at least a portion of the tiered nodes do not communicate directly with each other. Thereafter, the first node transmits the corresponding node specific messages to each of the plurality of tiered nodes. The first node, in response to the transmitted node specific messages, receives data comprising a plurality of responses in response to the receipt of the node-specific messages. The first node then orchestrates with the plurality of tiered nodes, completion of the transaction by transmitting messages to select nodes of the plurality of tiered nodes characterizing responses from other nodes for which the select nodes are not in direct communication.

The plurality of computing nodes can form a hierarchy in which the first node is a root node. Alternatively, the plurality of computing nodes can form a hierarchy in which the first node is a child node.

The first node can communicate with the plurality of tiered nodes using a uniform data transport protocol. Alternatively, the first node can communicate with a first subset of the plurality of tiered nodes using a first data transport protocol, and can communicate via a different, second subset of the plurality of tiered nodes using a different, second data transport protocol.

The generating can be based, for example, on pre-determined access visibility information associated with each of a plurality of fields within an initial message generated by the first node and the initial message is modified to result in the node specific messages.

In addition, in some variations, a second node in the multi-tier computing environment can access a second data object encapsulating values. The second node can generate node specific messages for each of a second plurality of tiered nodes in the multi-tier computing environment relating to a subset of the transaction. The node specific messages encapsulate at least a portion of the values in the accessed second data object and respectively are based on access visibility information associated with each such node. The second node can then transmit the corresponding node specific message to each of the second plurality of tiered nodes, the corresponding node specific message. The second node, in response to the transmitted node specific messages, can receive data including a plurality of responses in response to the receipt of the node-specific messages. The second node can then orchestrate, with the second plurality of tiered nodes, completion of the subset of the transaction by transmitting messages to select nodes of the second plurality of tiered nodes characterizing responses from other nodes for which the select nodes are not in direct communication.

The values can be associated with a purchase order for manufacture of goods and/or provision of services and the responses can relate to the manufacture of goods and/or the provision of services, and the completion of the transaction can pertain to fulfillment of the purchase order.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The current subject matter provides many technical advantages. For example, the current subject matter provides a computing environment that provides end-to-end visibility and collaboration in a multi-tier computing environment while, at the same time, reducing computing resource consumption and providing more efficient data flow. In particular, this visibility allows users to proactively manage volatile demand and to link product design, manufacturing, and fulfillment within a supply chain. Moreover, the coordinated computing environment with a shared planning and execution layer as described herein allows for advanced operational analytics about demand patterns, operations, and customer service requirements. Still further, the current subject matter enables for real-time data access across multiple computing nodes within a manufacturing computing environment which, in turn, allows for more optimal synchronization of aspects of a transaction such as supply and demand.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
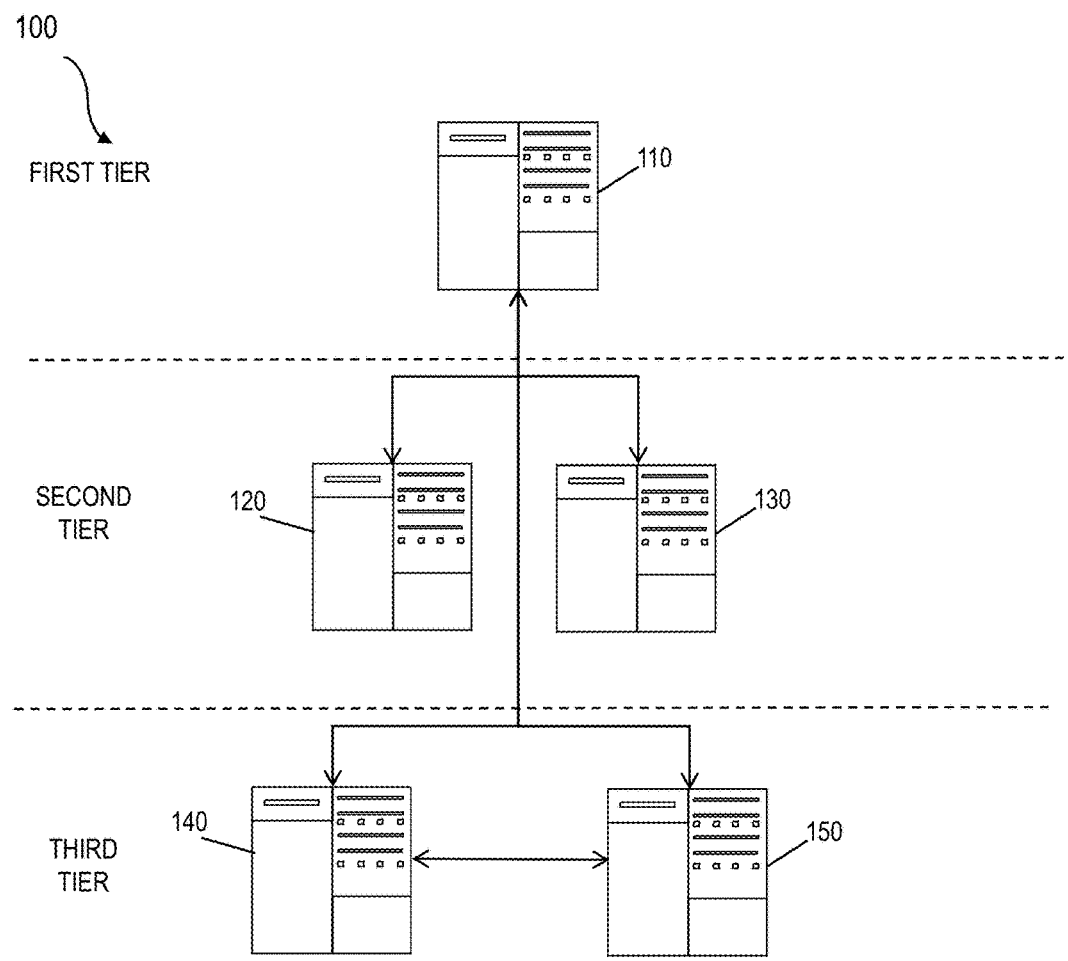
FIG. 1 is a system diagram illustrating a multi-tier computing environment.

FIG. 1 is a system diagram 100 illustrating a multi-tier computing environment that includes a plurality of nodes 110-150. Each node 110-150 can comprise a computing device having one or more data processors and memory storing instructions for execution by the processor(s). In addition, each node 110-150 can include a network interface for allowing it to communicate over networks to other nodes 110-150. In some cases, a node 110-150 can include or otherwise incorporate a database, while, in other variations, the node 110-150 can be in communication with a remote and separate database.

As is noted in FIG. 1, the nodes 110-150 are arranged such that a first node 110 is in communication with all of the other nodes 120-150 while, only a subset o the other nodes, 140, 150 communicate with each other. For purposes of this document, the term multi-tier refers to a computing environment in which not all nodes are in direct communication. However, the first node 110 of the multi-tier environment can be arranged to orchestrate various actions amongst the other nodes 120-150 to collectively effect completion of a transaction. This orchestration can be accomplished for example, by the first node 110 sending messages that are tailored to node types for the other nodes 120-150.

Figure 2:
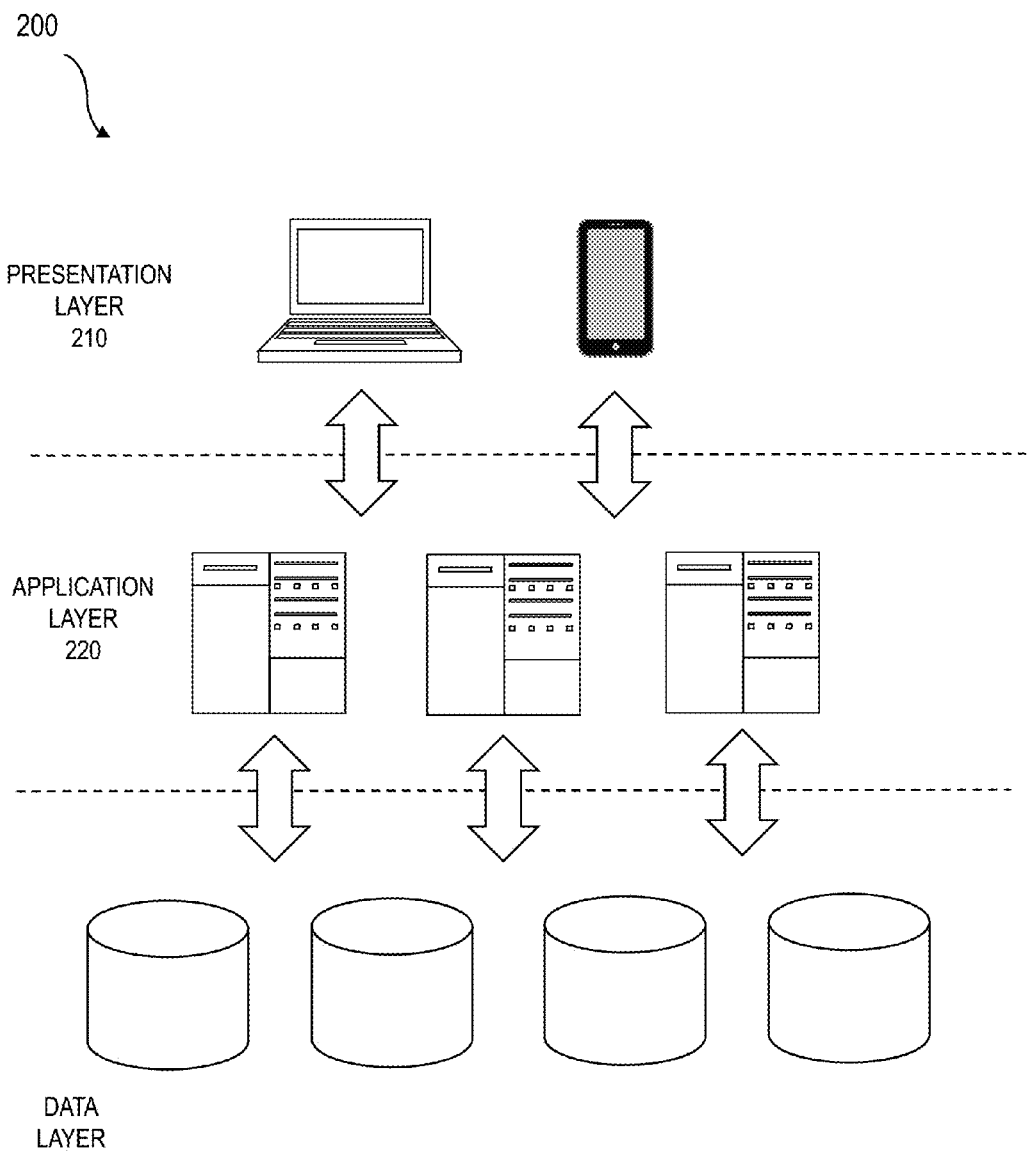
FIG. 2 is a system diagram illustrating a multi-layer computing architecture.
Figure 3:
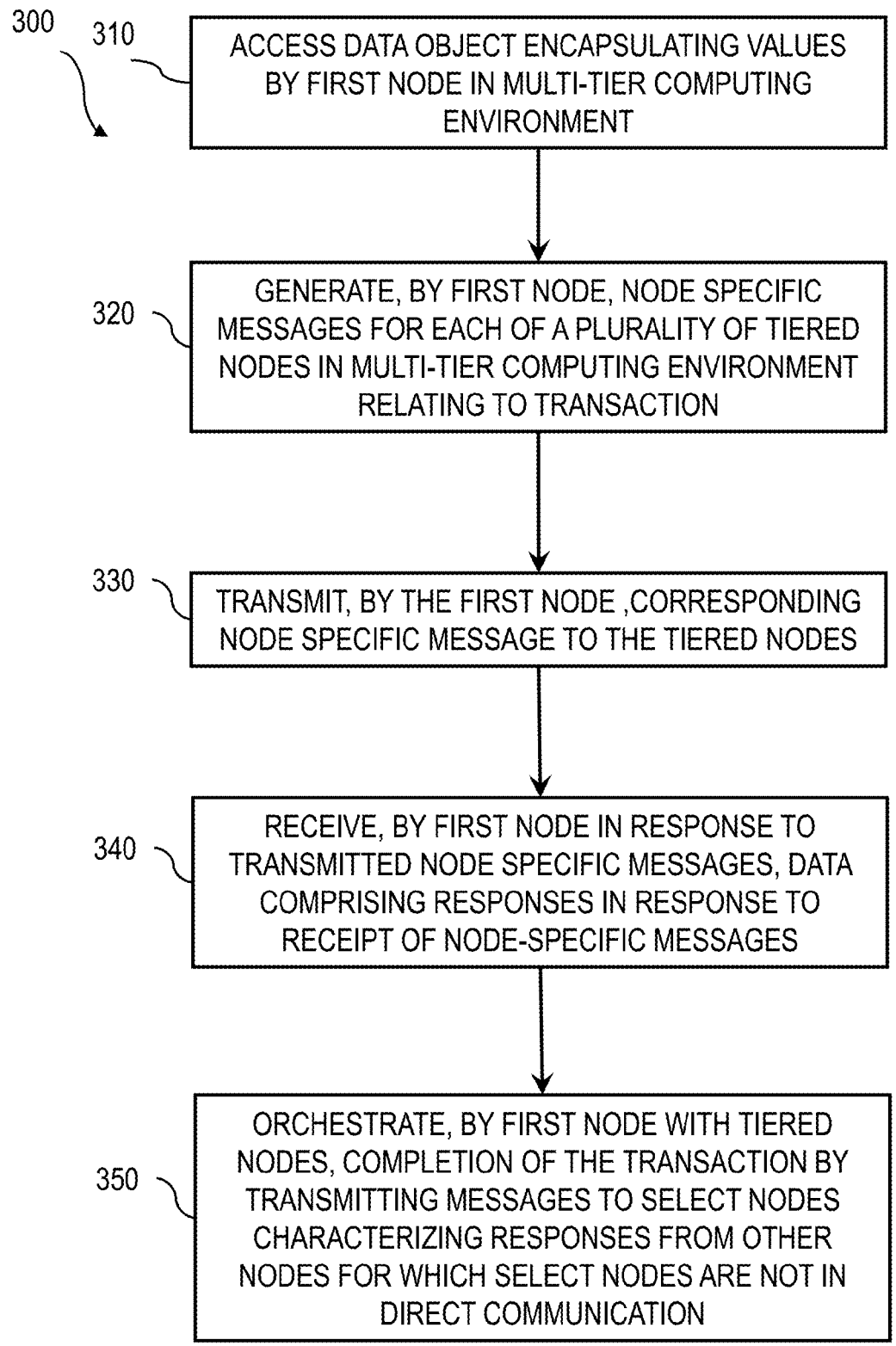
FIG. 3 is a process flow diagram illustrating transaction execution in a multi-tier computing environment.

The multi-tier computing environment of FIG. 1 can operate in a multi-layer computing architecture. FIG. 2 is a diagram 200 illustrating an example multi-tier architecture including a presentation tier 210, an application tier 220, and a data tier 230 that can be executed across multiple nodes 110-150 (e.g., a client-server architecture, etc.). Each of these tiers 210, 220, 230 can, in some cases, be implemented by separate and distinct nodes 110-150 (e.g., client devices in the presentation tier 210, servers in the application tier 220, and databases in the data tier 230, etc.) and, in other cases, be implemented by a single node 110-150.

The presentation tier 210 can execute a topmost layer in the multi-tier architecture which can be referred to, for example, as a presentation layer, which in turn, can, for example, execute user interface functionality (e.g., data presentation, interaction with graphical user interfaces, etc.). The presentation tier 210 can directly communicate with the application tier 220 and indirectly communicate with the data tier 230 via the application tier 220 and translate tasks from both tiers 220, 230 for user interaction.

The application tier 220 can include an application layer that includes logic to initiate queries to the data tier 230, to process results from the data tier 230 for ultimate presentation at the presentation tier 210, and to handle other data coordination and manipulation activities.

The data tier 230 can include data persistence mechanisms (database servers, file shares, etc.) and a data access layer that encapsulates the persistence mechanisms and exposes the data. The data access layer can provide an interface to the application tier 220 that exposes methods of managing the stored data without exposing or creating dependencies on the data storage mechanisms. Avoiding dependencies on the storage mechanisms allows for updates or changes without the application tier 220 clients being affected by or even aware of the change.

With reference to diagram 300, at 300, the first node 110 can access a data object within the multi-layered computing architecture that works in conjunction with the data access layer 230 and the application layers 220 to transport data to the other nodes 120-150 in an effort to effect the transaction. The multi-tier environment is arranged such that at least a portion of the tiered nodes 120-150 do not communicate directly with each other. This data object encapsulates values which are used to effect the transaction. Thereafter, at 320, the first node 110 generates node specific messages for each of a plurality of tiered nodes (i.e., nodes 120-150) in the multi-tier computing environment relating to a transaction. The node specific messages can encapsulate at least a portion of the values in the accessed data object and respectively can be based on access visibility information associated with each such node 120-150. This access visibility information can be based, for example, on node type or other classifications for the nodes 120-150. In some cases, these classifications can change or otherwise be determined using, for example, a rules engine which determines which values to send to which of the other nodes 120-150 based, for example, on the state of the transaction, the type of transaction or other factors.

Subsequently, at 330, the first node 110 transmits, to each of the plurality of tiered nodes 120-150, the corresponding node specific message. The node specific messages convey information pertaining to the transaction and can, in some cases, be used to complete or otherwise effect a portion of the transaction by consumption at the receiving node 120-150.

In response to the transmitted node specific messages, at 340, the first node 110 receives data comprising a plurality of responses in response to the node-specific messages. In some cases, these responses are sent in response to triggers occurring at the respective nodes 120-150. The triggers can, for example, relate to completion or other status information regarding aspects of the transactions. For example, completion of a computer-implemented task at one of the nodes 120-150.

Using these responses, the first node 110, at 350, orchestrates completion of the transaction with the plurality of tiered nodes by transmitting messages to select nodes of the plurality of tiered nodes 120-140 characterizing responses from other nodes for which the select nodes are not in direct communication.

It will be appreciated that more than one node can orchestrate completion of the transaction and/or completion of a subset of the transaction. While the foregoing describes the first node 110 as being on a top tier and being able to coordinate with all other nodes 120-150, it will be appreciated that other arrangements are available in which nodes 110-150 can communicate with each other on a peer to peer basis. For example, an arrangement can be provided such that the first node 110 does not communicate with node 140 but, rather, node 140 can only communicate with node 150. For example, node 140 can send redirect data to node 150 that it receives from the first node 110 either complete (e.g., a carbon copy) or partial.

The data exchange amongst the nodes 110-150 can take or otherwise utilize varying data transport protocols. In some cases, the data is transported in cXML format while in other variations different transport protocols are used. Still further, arrangements are possible in which a node (e.g. the first node, etc.) communicates with some nodes using a first data transport protocol and communicates with other nodes using a different, second data transport protocol.

The multi-tier computing environment can be used for a variety of different applications in which a transaction is to be completed using a plurality of different computing nodes, some of which do not communicate with each other. One example is in connection with contract manufacturing. Contract manufacturing, also known as outsource manufacturing, is a type of manufacturing in which a company relies on the skills of specialist manufacturers to produce one or more components of a final product (i.e., the transaction). Ultimately, the supply chain manager or main manufacturer is in charge of bringing the different components made by component manufacturers together and preparing a final product for delivery. Because contract manufacturers often do not play a role in the manufacture of an entire product and only need to focus on one area, the use of the multi-tier environment as provided herein can provide enhanced cost-effectiveness and scalability.

The current subject matter provides technical advantages which, in turn, allow for increased visibility to allows users to proactively manage volatile demand and to link product design, manufacturing, and fulfillment within a supply chain. Moreover, the coordinated multi-tiered computing environment with a shared planning and execution layer as described herein allows for advanced operational analytics about demand patterns, operations, and customer service requirements. Still further, the current subject matter enables for real-time data access across multiple computing nodes within a manufacturing computing environment which, in turn, allows for more optimal synchronization of supply and demand.

Figure 4:
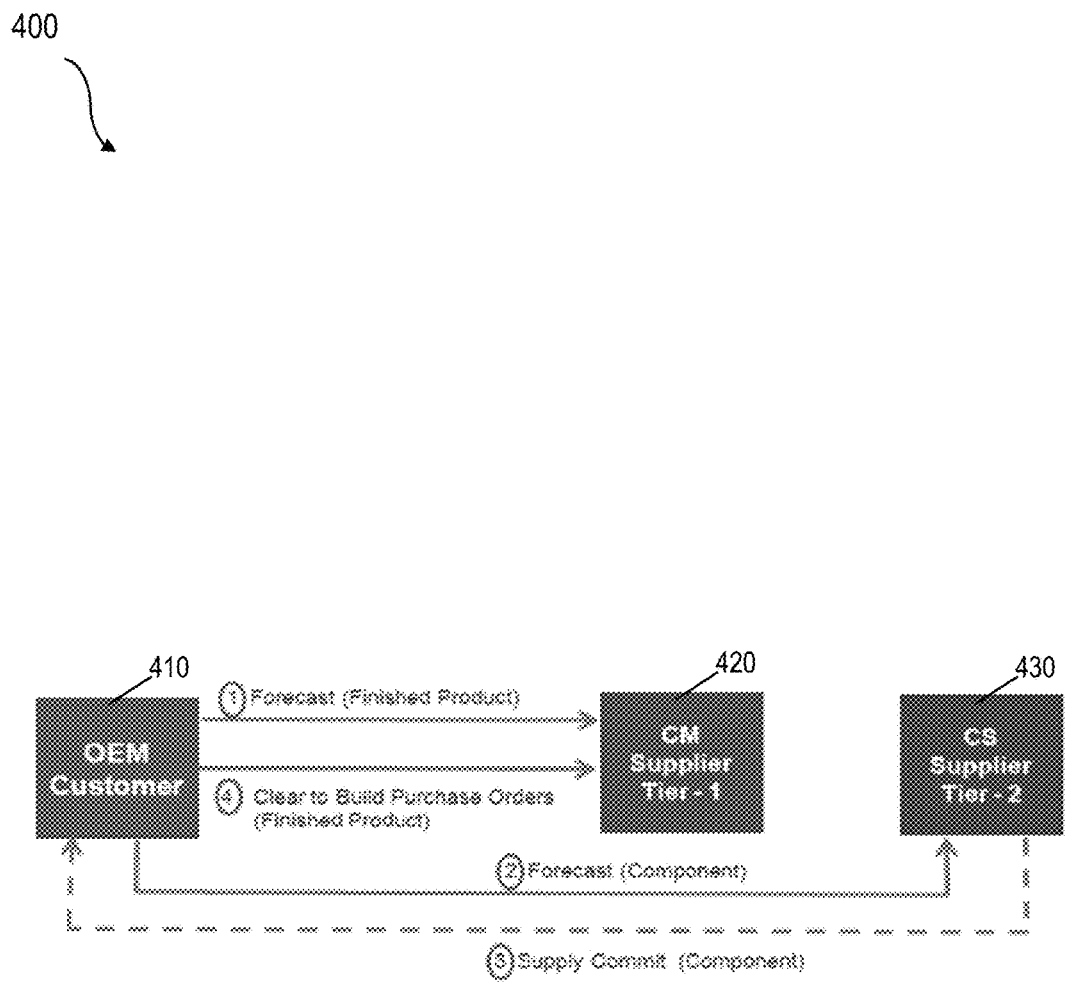
FIG. 4 is a data flow diagram illustrating the exchange of data amongst nodes in a multi-tier computing environment.

FIG. 4 is a diagram 400 of a two tier computing environment used in connection with a forecasting process. Initially, an OEM node 410 transmits first data to a tier one supplier node 420 that characterizes a forecast of finished product (e.g., product name, product type, product components, completion date, etc.). In parallel or in sequence, the OEM node 410 transmits second data to a tier two supplier node 430 that also characterizes a forecast of finished product (e.g., product name, product type, product components, completion date, etc.). With such an arrangement, the tier one supplier node 420 does not communicate with the tier two supplier node 430. The tier two supplier node 430 can subsequently transmit third data to the OEM node 410 that indicates that the tier two supplier node 430 commits to providing components specified in the second data according to restrictions specified in the second data. The OEM node 410 then sends fourth data to the first tier supplier node 420 characterizing that the first tier supplier node can then proceed to manufacture the product specified in the first data. In such an implementation, the OEM node 410 orchestrates completion of a product (i.e., a transaction in this example) by forecasting and coordinating availability of components from the first tier supplier node 420 and the second tier supplier node 430.

Figure 5:
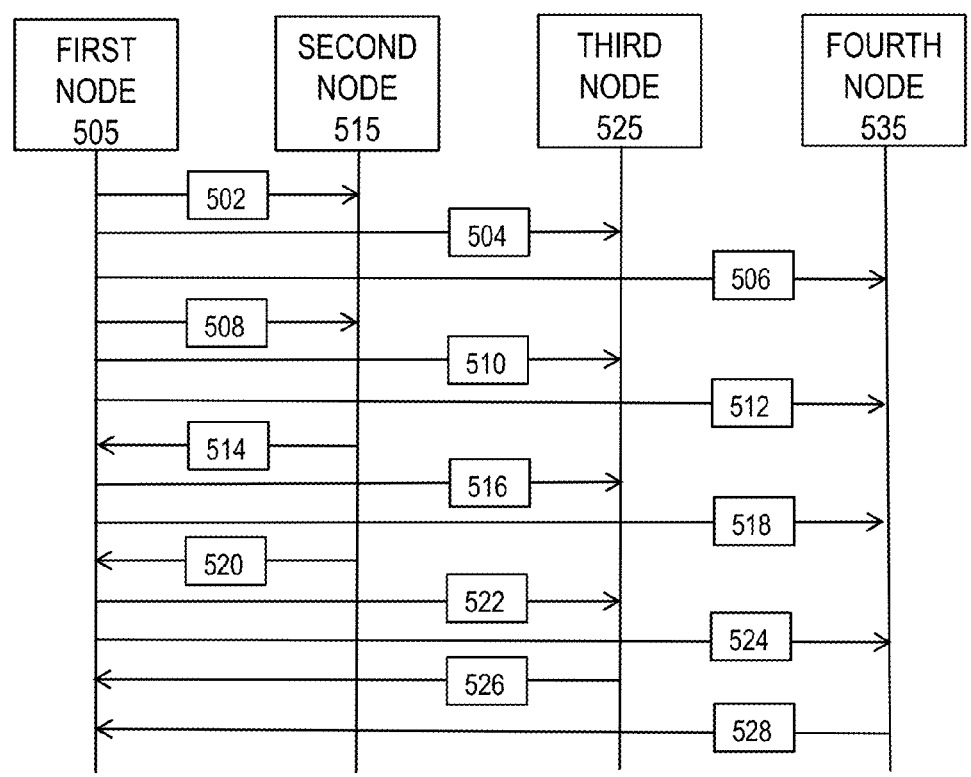
FIG. 5 is a signaling diagram illustrating orchestration amongst nodes of a multi-tier computing environment in connection with completion of a transaction.

FIG. 5 is a diagram 500 illustrating another multi-tier computing environment including a plurality of nodes 505, 515, 525, 535 in a multi-tier computing environment. The first node 505 can generate and transmit data 502 comprising a purchase order and transmit data characterizing such purchase order to a second node 515. The data 502 can be generated by accessing a data object encapsulating certain values. The first node 505 can, for example, be an ERP system or other system of an original equipment manufacturer (OEM). The second node 515 can be, for example, a computing system associated with a tier N supplier. The first node 505 can, in response, transmit data 504 including at least a subset of the values encapsulated in the data object to the third node 525. The third node 525 can, for example, be a tier N−1 supplier. The data 504 can, for example be a complete copy of the data 502 or it can be a variation of the data 502 that is tailored specific to the third node 525 (i.e., data 504 can only include information relating to components provided by the tier N−1 supplier). Subsequently, the first node 505 can transmit data 506 to the fourth node 535 that can, for example, also include values encapsulated in the business object. The fourth node 535 can, for example, be a computing system associated with a logistics provider that, in turn, can be used to orchestrate transportation of components needed by the various nodes 505, 515, 525 as part of a transaction.

In some cases, the values encapsulated in the data object can be modified. The first node 515 can automatically, in response to the modification of the values in the data object, generate and transmit data 508 comprising a purchase order modification and transmit data characterizing such purchase order modification to a second node 515. The data 510 can be generated by accessing the data object encapsulating certain values. Subsequently, the first node 505 can transmit data 510 including at least a subset of the values (including at least one modified value) encapsulated in the data object to the third node 515. The data 510 can, for example be a complete copy of the data 508 or it can be a variation of the data 508 that is tailored specific to the third node 525 (i.e., data 510 can only include information relating to components provided by the tier N−1 supplier). Later, the first node 505 can transmit data 512 to the fourth node 535 that can, for example, also include modified values (e.g., values associated with quantities, delivery dates, etc.) encapsulated in the business object.

The second node 515, at some later point, can transmit data 514 to the first node 505 that encapsulates data that confirms the purchase order. The first node 505, in parallel or subsequently, can transmit data 516 to the third node 525 that also encapsulates data confirming at least a portion of the purchase order (i.e., the third node 525 may not have full visibility into the end product, etc.). The first node 505 can then transmit data 518 to the fourth node 535 characterizing confirmation of at least a portion of the purchase order. These confirmations can be used, for example, to execute aspects of the transaction such as transmitting data to complete components, update inventories, and/or to arrange for transportation logistics.

The second node 515, at some later point, can transmit data 520 to the first node 505 that encapsulates data that specifies an advance shipment notice (ASN); namely a date on which the product will be transported to a facility associated with the first node. The first node 505, in parallel or subsequently, can transmit data 522 to the third node 525 that also encapsulates data specifying at least a portion of the ASN (i.e., the third node 525 may not have full visibility into the end product, etc.). The first node 505 can then transmit data 524 to the fourth node 535 characterizing confirmation of at least a portion of the ASN. These notices can be used, for example, to execute aspects of the transaction such as transmitting data to complete components, update inventories, and/or to arrange for transportation logistics.

After the product(s) has been shipped, the third node can transmit data 526 to the first node 505 encapsulating data requesting and/or confirming receipt of goods. In addition, the fourth node 535 can transmit data 528 encapsulating a confirmation of the shipment of the product(s).

In some scenarios, one or more of the data transmissions associated with the second and third nodes 515, 525 are triggered in response to consumption of goods at a site associated with a particular node 515, 525. For example, a computer-controlled inventory management system can automatically, without human intervention, identify when a particular components has been consumed, and as a result, data encapsulating a notification or other related message can be transmitted to another node within the computing environment to facilitate completion of the transaction. The consumption information can be implemented, using for example, a column-oriented in-memory database system that, in turn, can be used to provide real-time visibility into the availability of various components and the like.

Messages pertaining to subcontracting (e.g., interactions between the second node 515 and the third node 525) can take various forms including. Some example fields can include, one or more those included in Table 1 below.

TABLE 1

| Level | Field | Description |
|---|---|---|
| Item | ItemCategory | A code defining how a material is procured |
|  | BuyerBatchID | An identifier from buyer to identify the material/goods produced in a single manufacturing run |
|  | SupplierBatchID | An identifier from supplier to identify the material/goods produced in a single manufacturing run |
|  | ProductionDate | Date on which when a batch of material/goods is produced |
|  | ExpirationDate | Date on which when a batch of material/goods becomes expired |
|  | OriginCountryCode | Country of origin for a batch of material/goods |
| Component | ComponentID | An identifier for a subcontracting component within the procurement process |
|  | Description | Component description |
|  | StandardID | A standardized identifier for a component, and the identification scheme is managed by an agency |
|  | BuyerPartID | An identifier for a component assigned by buyer |
|  | SupplierPartID | An identifier for a component assigned by supplier |
|  | BuyerBatchID | An identifier from buyer to identify the material/goods produced in a single manufacturing run |
|  | SupplierBatchID | An identifier from supplier to identify the material/goods produced in a single manufacturing run |
|  | ProductRevisionID | A sequential number that is assigned when changes are made to a component |
|  | RequirementDate | Date on which when a component is required |
|  | Quantity | An amount of components in a unit of measurement |
|  | UnitOfMeasure | Unit of which a quantity is accounted for and expressed |
|  | Property Valuation | An element carrying a value that can be assigned to characteristics, such as property values pertaining to currency amounts, quantities, or dates, etc. It can include the property to be valued and the associated values. |

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation within a multi-tier computing environment having a plurality of tiered nodes, the method comprising:
   accessing, by a first node in the multi-tier computing environment, a data object encapsulating values;
   generating, by the first node, node specific messages for each of a plurality of tiered nodes in the multi-tier computing environment relating to a transaction, the node specific messages encapsulating at least a portion of the values in the accessed data object and respectively being based on access visibility information associated with each such node such that at least some of the node specific messages encapsulate different values, the multi-tier computing environment being arranged such that at least a portion of the tiered nodes do not communicate directly with each other;
   transmitting, by the first node to each of the plurality of tiered nodes, the corresponding node specific message;
   receiving, by the first node in response to the transmitted node specific messages, data comprising a plurality of responses in response to the receipt of the node specific messages; and
   orchestrating, by the first node with the plurality of tiered nodes, completion of the transaction by transmitting messages to select nodes of the plurality of tiered nodes characterizing responses from other nodes for which the select nodes are not in direct communication.

2. The method of claim 1, wherein the plurality of computing nodes form a hierarchy in which the first node is a root node.

3. The method of claim 1, wherein the plurality of computing nodes form a hierarchy in which the first node is a child node.

4. The method of claim 1, wherein the first node communicates with the plurality of tiered nodes using a uniform data transport protocol.

5. The method of claim 1, wherein the first node communicates with a first subset of the plurality of tiered nodes using a first data transport protocol, and a different, second subset of the plurality of tiered nodes using a different, second data transport protocol.

6. The method of claim 1, wherein the generating is based on pre-determined access visibility information associated with each of a plurality of fields within an initial message generated by the first node and the initial message is modified to result in the node specific messages.

7. The method of claim 1, further comprising:
   accessing, by a second node in the multi-tier computing environment, a second data object encapsulating values;
   generating, by the second node, node specific messages for each of a second plurality of tiered nodes in the multi-tier computing environment relating to a subset of the transaction, the node specific messages encapsulating at least a portion of the values in the accessed second data object and respectively being based on access visibility information associated with each such node;
   transmitting, by the second node to each of the second plurality of tiered nodes, the corresponding node specific message;
   receiving, by the second node in response to the transmitted node specific messages, data comprising a plurality of responses in response to the receipt of the node specific messages; and
   orchestrating, by the second node with the second plurality of tiered nodes, completion of the subset of the transaction by transmitting messages to select nodes of the second plurality of tiered nodes characterizing responses from other nodes for which the select nodes are not in direct communication.

8. The method of claim 1, wherein the values are associated with a purchase order for manufacture of goods and/or provision of services and the responses relate to the manufacture of goods and/or the provision of services, and the completion of the transaction pertains to fulfillment of the purchase order.

9. A system forming part of a multi-tier computing environment having a plurality of tiered nodes, the system comprising:
   at least one data processor; and
   memory storing instructions which, when executed by the at least one data processor, result in operations comprising:
      accessing, by a first node in the multi-tier computing environment, a data object encapsulating values;
      generating, by the first node, node specific messages for each of a plurality of tiered nodes in the multi-tier computing environment relating to a transaction, the node specific messages encapsulating at least a portion of the values in the accessed data object and respectively being based on access visibility information associated with each such node such that at least some of the node specific messages encapsulate different values, the multi-tier computing environment being arranged such that at least a portion of the tiered nodes do not communicate directly with each other;

transmitting, by the first node to each of the plurality of tiered nodes, the corresponding node specific message;

receiving, by the first node in response to the transmitted node specific messages, data comprising a plurality of responses in response to the receipt of the node specific messages; and orchestrating, by the first node with the plurality of tiered nodes, completion of the transaction by transmitting messages to select nodes of the plurality of tiered nodes characterizing responses from other nodes for which the select nodes are not in direct communication.

10. The system of claim 9, wherein the plurality of computing nodes form a hierarchy in which the first node is a root node.

11. The system of claim 9, wherein the plurality of computing nodes form a hierarchy in which the first node is a child node.

12. The system of claim 9, wherein the first node communicates with the plurality of tiered nodes using a uniform data transport protocol.

13. The system of claim 9, wherein the first node communicates with a first subset of the plurality of tiered nodes using a first data transport protocol, and a different, second subset of the plurality of tiered nodes using a different, second data transport protocol.

14. The system of claim 9, wherein the generating is based on pre-determined access visibility information associated with each of a plurality of fields within an initial message generated by the first node and the initial message is modified to result in the node specific messages.

15. The system of claim 9, wherein the operations further comprise:

accessing, by a second node in the multi-tier computing environment, a second data object encapsulating values;

generating, by the second node, node specific messages for each of a second plurality of tiered nodes in the multi-tier computing environment relating to a subset of the transaction, the node specific messages encapsulating at least a portion of the values in the accessed second data object and respectively being based on access visibility information associated with each such node;

transmitting, by the second node to each of the second plurality of tiered nodes, the corresponding node specific message;

receiving, by the second node in response to the transmitted node specific messages, data comprising a plurality of responses in response to the receipt of the node specific messages; and orchestrating, by the second node with the second plurality of tiered nodes, completion of the subset of the transaction by transmitting messages to select nodes of the second plurality of tiered nodes characterizing responses from other nodes for which the select nodes are not in direct communication.

16. The system of claim 9, wherein the values are associated with a purchase order for manufacture of goods and/or provision of services and the responses relate to the manufacture of goods and/or the provision of services, and the completion of the transaction pertains to fulfillment of the purchase order.

17. A non-transitory computer program product storing instructions which, when executed by at least one data processor forming part of at least one computing system, result in operations comprising:

accessing, by a first node in a multi-tier computing environment having a plurality of tiered nodes, a data object encapsulating values;

generating, by the first node, node specific messages for each of a plurality of tiered nodes in the multi-tier computing environment relating to a transaction, the node specific messages encapsulating at least a portion of the values in the accessed data object and respectively being based on access visibility information associated with each such node such that at least some of the node specific messages encapsulate different values, the multi-tier computing environment being arranged such that at least a portion of the tiered nodes do not communicate directly with each other;

transmitting, by the first node to each of the plurality of tiered nodes, the corresponding node specific message;

receiving, by the first node in response to the transmitted node specific messages, data comprising a plurality of responses in response to the receipt of the node specific messages; and orchestrating, by the first node with the plurality of tiered nodes, completion of the transaction by transmitting messages to select nodes of the plurality of tiered nodes characterizing responses from other nodes for which the select nodes are not in direct communication.

18. The computer program product of claim 17, wherein the first node communicates with a first subset of the plurality of tiered nodes using a first data transport protocol, and a different, second subset of the plurality of tiered nodes using a different, second data transport protocol.

19. The computer program product of claim 17, wherein the operations further comprise:

accessing, by a second node in the multi-tier computing environment, a second data object encapsulating values;

generating, by the second node, node specific messages for each of a second plurality of tiered nodes in the multi-tier computing environment relating to a subset of the transaction, the node specific messages encapsulating at least a portion of the values in the accessed second data object and respectively being based on access visibility information associated with each such node;

transmitting, by the second node to each of the second plurality of tiered nodes, the corresponding node specific message;

receiving, by the second node in response to the transmitted node specific messages, data comprising a plurality of responses in response to the receipt of the node specific messages; and orchestrating, by the second node with the second plurality of tiered nodes, completion of the subset of the transaction by transmitting messages to select nodes of the second plurality of tiered nodes characterizing responses from other nodes for which the select nodes are not in direct communication.

20. The computer program product of claim 19, wherein the values in the first data object and the second data object are associated with a purchase order for manufacture of goods and/or provision of services and the responses relate to the manufacture of goods and/or the provision of services, and the completion of the transaction pertains to fulfillment of the purchase order.

\* \* \* \* \*